United States Patent [19]
Peterson

[11] 3,823,983
[45] July 16, 1974

[54] WHEEL CONSTRUCTION

[76] Inventor: William B. Peterson, 2750 E. Spring St., Long Beach, Calif. 90806

[22] Filed: Nov. 3, 1972

[21] Appl. No.: 303,333

[52] U.S. Cl............................... 301/43, 94/50 PR
[51] Int. Cl...................... E01d 19/25, B60b 15/08
[58] Field of Search.................. 301/43 R, 41, 39 R; 94/50 PR

[56] References Cited
UNITED STATES PATENTS

| | | | |
|---|---|---|---|
| 852,830 | 5/1907 | Einfeldt | 301/43 |
| 3,071,050 | 1/1963 | Shatto | 301/43 X |
| 3,450,013 | 6/1969 | Peterson | 301/39 R X |
| 3,687,023 | 8/1972 | Moser | 301/43 |

FOREIGN PATENTS OR APPLICATIONS

| | | | |
|---|---|---|---|
| 65,269 | 6/1914 | Austria | 301/43 |

*Primary Examiner*—Richard J. Johnson
*Attorney, Agent, or Firm*—Fulwider, Patton, Rieber, Lee & Utecht

[57] ABSTRACT

A wheel assembly is described which is usable with a vehicle such as a tractor or the like in compacting, spreading and dozing of rubbish, trash, refuse or garbage materials. The wheel assembly includes a steel, cylindrical rim which carries cleat means thereon in the form of radial projections disposed circumferentially about the wheel. Each projection comprises a major web which is aligned transversely to the direction of travel of the wheel with at least one gusset web dependent therefrom and oriented thereto at an obtuse angle in alignment with the direction of travel of the wheel. The webs are relatively thin in cross-section with a thickness of preferably about ⅜. The cleat means are disposed in two, three, four or more circumferential rows about the wheel. The wheel can have a hub and annular flange means extending from the hub to the substantially flat cylindrical rim or can comprise an open-ended drum adapted for mounting over the outer surface of a conventional pneumatic tire. In its preferred embodiment, the wheel comprises a plurality of circumferential rows of cleats, and each cleat has its major web aligned at about 45° to the direction of rotation of the wheel with a gusset web at each end thereof which is aligned substantially parallel to the direction of rotation of the wheel. The aforementioned construction provides a self-cleaning wheel which does not provide any intersticies, pockets or traps for the accumulation of dirt and debris, and the driving force of the tractor is sufficient to dislodge any dirt or debris from the wheel cleats.

4 Claims, 7 Drawing Figures

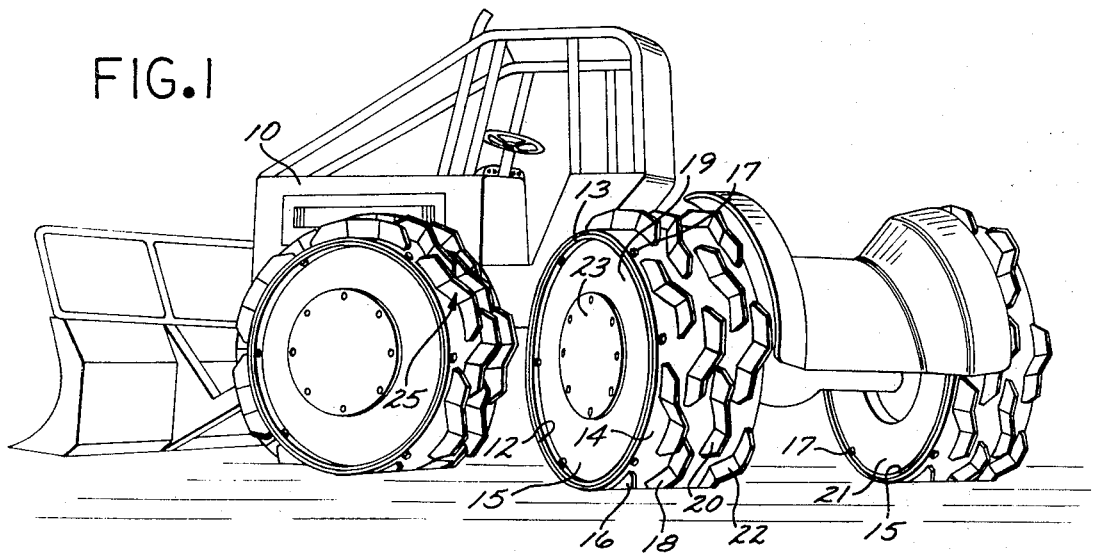
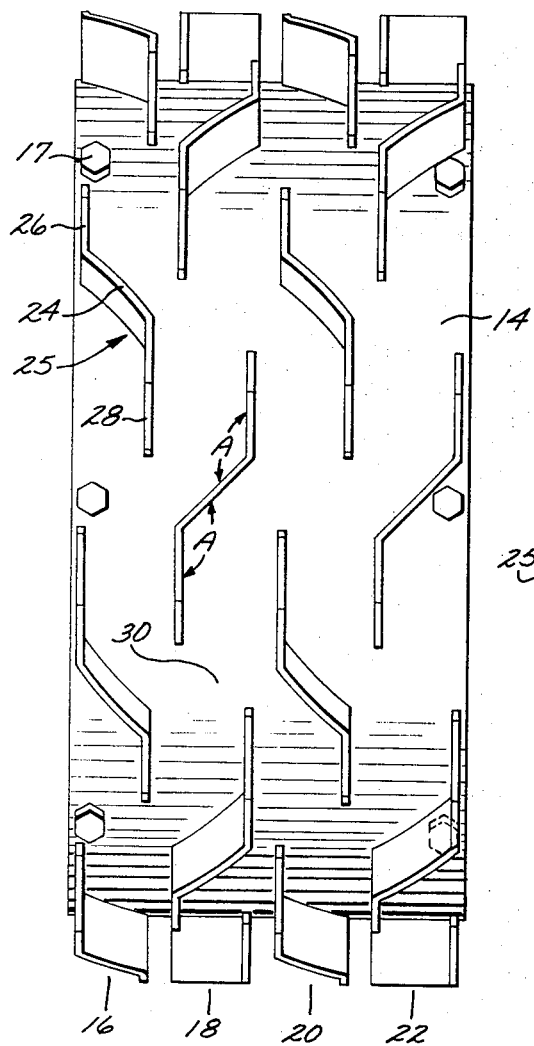
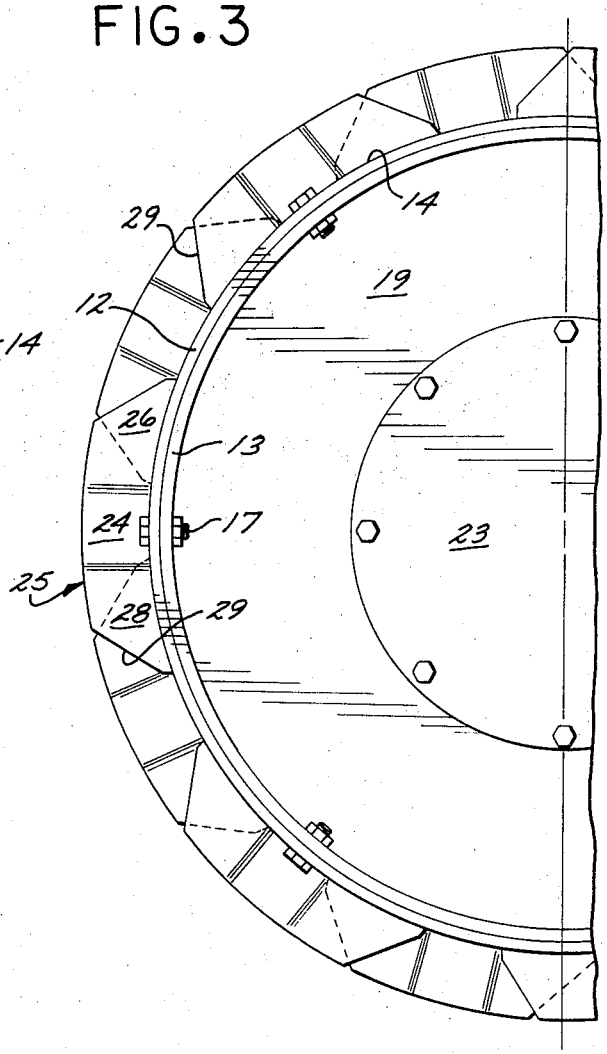

WHEEL CONSTRUCTION

BACKGROUND OF THE INVENTION

1. Field of the Invention

The present invention relates generally to the field of material handling and, particularly, to wheels for vehicles which are employed on loosely consolidated terrain such as vehicles used in refuse compaction, crushing, dozing or the like.

Description of the Prior Art

Vehicles employed in loose and unconsolidated terrain have employed wheels of substantially flat, cylindrical steel rims on which are mounted various cleat devices. A cleat for successful employment in this service must satisfy a number of operational criteria. The cleats must be self-cleaning to avoid the accumulation of dirt and debris on the wheel. The cleats must be of sufficient strength to resist bending or breaking and should be arranged in such a manner and of the proper shape to exert maximum crushing and demolition action while providing the necessary traction for the vehicle. A variety of cleats have been proposed for this service, including those having tapered construction with a wide base at the wheel rim and a narrow cutting edge. This type of cleat is generally not satisfactory because its tapered cross-section limits the penetration of the cleat into the terrain. Another type of cleat which has been employed is formed by a substantially flat, thin blade, and these cleats have been arranged diagonally about a wheel in two circumferential rows in a chevron fashion. Because these cleats are too thin to withstand the high torque loads and weights applied to the wheels, supporting or reinforcing gussets have been used at the ends of the cleats. Commonly, the reinforcing gussets are a short upright rib which is mounted perpendicular to the cleat and at each end thereof. In practice, it has been found that the aforementioned structure is not ideally suited for use on loosely consolidated terrain. The cleats and their supporting gussets form traps for the accumulation of dirt and debris which become tightly packed into the traps. As a result, the operation of the wheel is impaired or frequent cleaning of the wheel's surface is required.

SUMMARY OF THE INVENTION

It is an object of this invention to provide a wheel construction for use on vehicles employed on loosely consolidated terrain which will provide maximum traction and crushing and demolition action for the wheel.

It is also an object of this invention to provide the aforedescribed wheel which resists compaction and accumulation of dirt and debris on its outer surface.

It is a further object of this invention to provide such a wheel surface for direct mounting onto vehicles.

It is a further object of this invention to provide the aforedescribed wheel in the form of an open-ended drum adaptable for mounting over conventional, pneumatic tires carried by such vehicles.

The aforedescribed objectives are accomplished by this invention which comprises a wheel having a substantially flat, cylindrical rim bearing a plurality of cleat means which are disposed circumferentially about its outer surface. Each cleat means comprises a major web that is aligned transversely of the direction of rotation of the wheel with at least one gusset web dependent therefrom and oriented at an obtuse angle to the major web which is open in the direction of rotation of the wheel. This construction eliminates right or acute angles in the direction of travel of the wheel and thereby eliminates pockets or traps in which dirt and debris can be compacted by rotation of the wheel surface. In its preferred embodiment, the cleat means comprises a major web as aforedescribed with gusset webs supported at each end thereof which are aligned substantially parallel to the direction of travel of the wheel, the cleat means thereby taking the form of a modified "Z" or "S" shape. The webs are formed of thin metallic sheets to ensure maximum penetration of the cleat into the terrain.

Other objects and advantages of the invention will be more apparent in consideration of a detailed description of the invention and its operation.

BRIEF DESCRIPTION OF THE DRAWINGS

FIG. 1 is a view of a four wheeled vehicle equipped with wheels according to this invention.

FIG. 2 is a view of the rear of a wheel shown in FIG. 1 and having four circumferential rows of cleat means.

FIG. 3 is a side view of the wheel of FIG. 2.

DESCRIPTION OF PREFERRED EMBODIMENT

Figure 4:
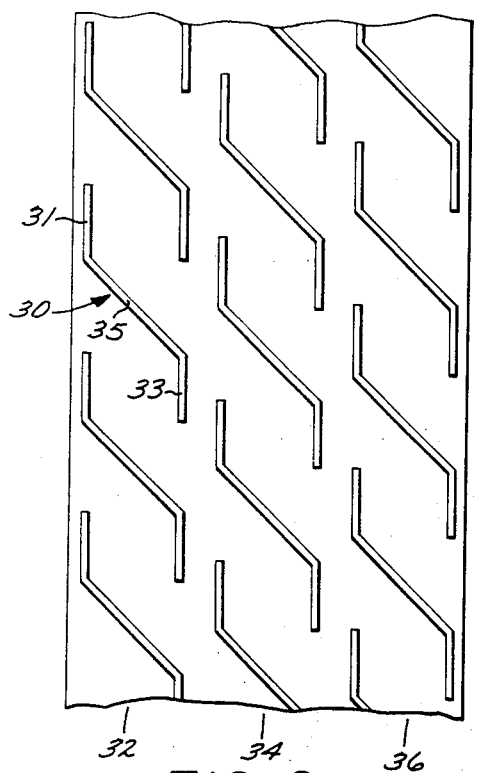
FIG. 4 is a view of a wheel having three rows of cleat means with the webs of the cleats in each row parallel and in substantial alignment.

Referring now to FIG. 1, there is illustrated a vehicle 10 such as a conventional, self-powered tractor having four wheels, each of which is provided with a substantially flat cylindrical wheel embodying the present invention. The tractor 10 is adapted to be employed for various material handling tasks such as dozing, compaction, crushing or demolishing of rubbish or the like and in which this service is commonly employed on loose and unconsolidated terrain. As illustrated in FIG. 1, the wheel is an open-ended drum 12 with a substantially flat and cylindrical outer surface 14. The drum is fitted about a conventional pneumatic tire in accordance with the invention described in my prior U.S. Pat. No. 3,450,013. In this embodiment, the open-ended drum is placed over conventional pneumatic tires of the tractor which are radially expanded into peripheral engagement with the inside of the drum 12 by inflation. The wheels also include detachable peripheral retainer means in the form of rings 13 and 15 which are secured to the drum 12 by bolts 17. Each drum also carries inboard and outboard shield means in the form of circular plates 19 and 21. Spacer rings, not shown, are carried on the inner periphery of each drum 12, and the shields 19 and 21 are retained between these spacer rings and retainer rings 13 and 15. Each outboard shield 19 also carries a coaxial circular plate 23 removably secured thereto by bolts to provide access to the wheel and tire. The aforementioned drum and wheel construction is the same as the invention described in my prior U.S. Pat. No. 3,450,013 which is incorporated herein by reference.

Circumferentially disposed about the periphery of surface 14 are a plurality of cleats 25. These cleats are illustrated as being positioned in a plurality of circumferential rows 16, 18, 20 and 22 about each wheel. 8

Referring now to FIG. 2, the shape and construction of the cleats and their arrangement on a wheel will be described. The cleats are shown as each comprising a major web 24 with dependent front and rear gusset or support webs designated 26 and 28, respectively, extending from each end thereof. The major web 24 is, as illustrated, positioned at an angle of about 45° to the direction of rotation. A suitable angle can be from about 30° to about 60° and preferably from about 40° to about 50° to the direction of rotation of the wheel. The web is formed of a thin metallic sheet stock which can be attached to the wheel by suitable means, e.g., welding. The thickness of the sheet stock of the web and its height are selected to achieve maximum penetration of the web into the loose terrain and debris which is encountered on refuse dumping areas. Generally the ratio of thickness to height of the web should be from about ⅜ to about 1/12. The optimum ratio of about ⅜ is illustrated. In typical embodiments, the web can be ½ inch thick and about 4 inches high to about 6/8 inch thick and about 6 inches high. Alternatively, the cleats 25 may be cast with the thickness thereof about twice as great at the radially inner end of each cleat as the radially outer end thereof.

At each end of web 24, there is positioned the front and rear gusset or support webs 26 and 28. These webs can be integral extensions of the major web 24 which can be bent or cast into the approximately Z-shape illustrated, or can be separate webs which are joined by welding or suitable means to the ends of the major web 24. The gusset or reinforcing webs 26 and 28 preferably have a thickness to height ratio equal or approximate to that of the major web and are oriented thereto in the direction of rotation of the wheel to provide with major web 24 an obtuse angle A, facing the direction of rotation of the wheel. The angle A preferably is from about 120° to about 150°, most preferably 135°, as illustrated in FIG. 2. Arrangement of the gusset and major webs in this fashion will ensure that the wheel is self-cleaning, since the force of rotation will tend to dislodge material from the juncture or intersection of these webs.

The cleats are disposed in parallel, circumferential rows 16, 18, 20 and 22. In the embodiment illustrated in FIGS. 2 and 3, the cleats of every other row, e.g., rows 16 and 20 are aligned in a like fashon on the wheel with the major webs in each row being parallel and disposed opposite to a cleat of the other row. The cleats in the adjacent rows, e.g., rows 16 and 18, are in staggered and inverse orientation. The cleats in these rows are inverted to each other so that the major webs 24 of cleats in a row are at substantial right angles to the major webs of cleats in the adjacent row. The cleats, however, are staggered between adjacent rows so that a substantial open area 30 exists between the major webs and accumulation of debris in this area is not possible.

The gusset webs 26 and 28 are arranged substantially parallel to the direction of rotation of the wheel. As shown in FIG. 3, the outboard edge 29 of each gusset rib is tapered, or champered radially outwardly towards said major web at an angle of from about 30° to about 60°. This construction minimizes bending or deformation of the gusset ribs and ensures maximum penetration of the cleats into the terrain.

FIG. 4 illustrates an arrangement of three circumferential rows 32, 34 and 36 of the Z-shaped cleats 29. These cleats are similar to those described with regard to FIGS. 2 and 3; however, the gusset or reinforcing webs 31 and 33 are of lesser length. Additionally, the outboard ends or edges of the gusset webs 31 and 33 are not tapered or champered. The cleats of all of the circumferential rows on the wheel are arranged in the same orientation to provide a series of major webs 35 that are substantially parallel. The cleats of each adjacent row, however, are in staggered orientation to those of the adjacent row.

Figure 5:
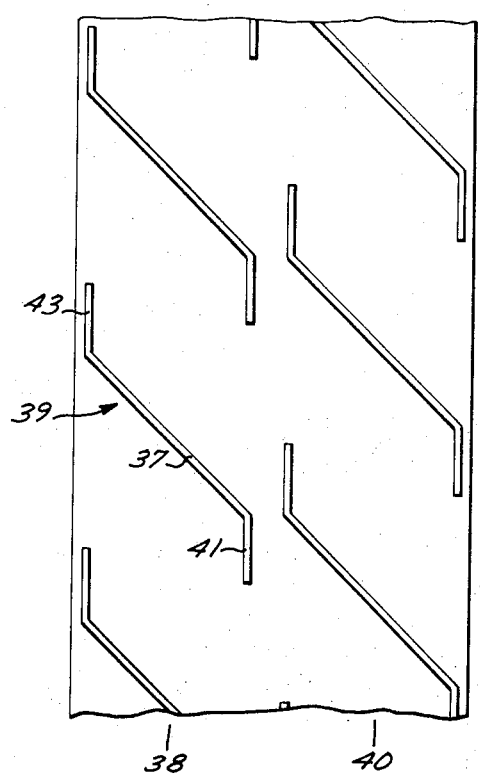
FIG. 5 is a view of a wheel having two circumferential rows of cleats having their major webs in substantial alignment.

FIG. 5 illustrates another arrangement of cleats 39 on the outer surface of a wheel. These cleats are arranged in two circumferential rows 36 and 38 with the major webs 37 of each cleat being in substantial alignment with the major web of the cleat in the adjacent row so that these cleats provide a transverse web extending substantially across the entire width of the wheel in an almost continuous fashion. These webs, however, are substantially stronger than can be obtained with a single transverse web because of the inboard gusset webs 41 which support the inboard ends of each of the major webs 37. The outboard gusset webs 43 are identical in shape and alignment in the inboard gusset webs 41.

Figure 6:
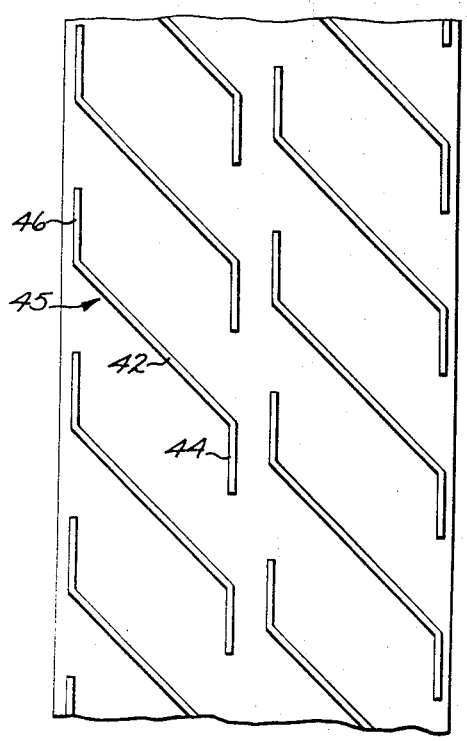
FIG. 6 is a view of a wheel similar to FIG. 5, but having a closer spacing of the cleats in the circumferential rows.

FIG. 6 illustrates another arrangement of cleats 45 with major webs 42 that is similar to that shown in FIG. 5; however, these cleats are in closer circumferential spacing than those shown in FIG. 5. The gusset webs 44 and 46 are similar to those shown in FIG. 4.

Figure 7:
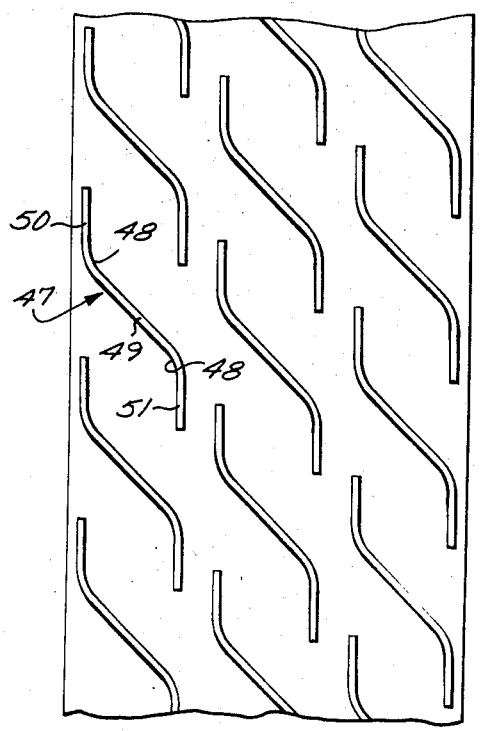
FIG. 7 is a view of a wheel having cleats with curved or rounded junctures between the major and gusset web sections.

FIG. 7 illustrates another shape of cleats that can be employed. In this embodiment, the cleats 47 have a modified S-shape. The cleats are formed by providing an arcuate or rounded juncture 48 between each major web 49 and gusset webs 50 and 51. As previously described with reference to FIGS. 2 and 3, the major and gusset webs of the cleats can be integral, being formed of a single sheet which can be bent into the desired shape, can be formed of separate sheets which are joined or welded together, or can be cast. Preferably, the major and gusset webs are integral.

The cleats of the wheel of this invention are ideally suited for use on wheels employed on loosely consolidated terrain. The cleats can be provided in relatively short lengths and will permit a greater flexibility in their arrangement about a wheel surface than with other cleats which are presently available. This provides a great plurality of interrupted ground pressure points and increases the crushing and demolition action of the wheel, as well as providing the necessary traction fo the vehicle. The variety of arrangements of the cleats that are possible on the wheel can be further increased by the arrangement of the wheels on the vehicle. With vehicles having trailing wheels, the wheel can be reversed on the trailing wheel so that the major webs of the cleats on the trailing wheel are perpendicular rather than parallel to those on the leading wheel, thereby increasing the crushing and demolition action of the vehicle.

The preceding discussion has been directed to preferred and illustrated embodiments. It is not intended that the invention be unduly limited by such illustration. Instead, it is intended that the invention be defined by the elements and their obvious equivalents set forth in the following claims:

I claim:
1. A compactor wheel, comprising:
   a drum having a substantially flat, cylindrical outer surface; and
   at least two rows of cleats, each row consisting of a plurality of generally Z or S-shaped cleats disposed circumferentially on the outer peripheral surface of said drum, said cleats being in the form of radial projections with each projection having a major web positioned at an angle of about 30° to 60° to the direction of rotation of the wheel, and front and rear gusset webs extending from the front and rear of said major web in the direction of rotation of the wheel.

2. The wheel of claim 1 wherein each said web has a ratio of thickness to height of from about ⅜ to about 1/12.

3. The wheel of claim 1 wherein the outboard edge of each of said gusset webs tapers radially outwardly and towards said major web.

4. The wheel of claim 3 wherein each of said web has a ratio of thickness to height of from about ⅛ to about 1/12.

* * * * *

UNITED STATES PATENT OFFICE
CERTIFICATE OF CORRECTION

Patent No. 3,823,983     Dated July 16, 1974

Inventor(s) William B. Peterson

It is certified that error appears in the above-identified patent and that said Letters Patent are hereby corrected as shown below:

In the abstract, line 13, delete "3/8" and substitute therefor, -- 1/8 --. In the specification, Column 2, line 48, delete "which". In Column 3, line 7, delete "8"; line 25, delete "3/8" and substitute therefor, -- 1/8 --; line 26, delete "3/8" and substitute therefor, -- 1/8 --. In the Claims: In Claim 2, line 2, delete "3/8" and substitute therefor, -- 1/8 --.

Signed and sealed this 5th day of November 1974.

(SEAL)
Attest:

McCOY M. GIBSON JR.
Attesting Officer

C. MARSHALL DANN
Commissioner of Patents